(12) United States Patent
Hicks et al.

(10) Patent No.: US 11,194,703 B2
(45) Date of Patent: Dec. 7, 2021

(54) SYSTEM TESTING INFRASTRUCTURE FOR ANALYZING SOFT FAILURES IN ACTIVE ENVIRONMENT

(71) Applicant: INTERNATIONAL BUSINESS MACHINES CORPORATION, Armonk, NY (US)

(72) Inventors: Andrew C. M. Hicks, Wappingers Falls, NY (US); Ryan Thomas Rawlins, New Paltz, NY (US); Dale E. Blue, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

(21) Appl. No.: 16/819,320

(22) Filed: Mar. 16, 2020

(65) Prior Publication Data

US 2021/0286710 A1 Sep. 16, 2021

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01)

(58) Field of Classification Search
CPC .......................... G06F 11/3684; G06F 11/3688
See application file for complete search history.

(56) References Cited

U.S. PATENT DOCUMENTS

| | | | |
|---|---|---|---|
| 5,493,667 A | 2/1996 | Huck | |
| 6,959,431 B1 | 10/2005 | Siels | |
| 7,886,242 B1 * | 2/2011 | Chakraborti | ... G01R 31/318357 716/106 |
| 8,347,271 B1 | 1/2013 | Nallasivam | |
| 8,935,673 B1 | 1/2015 | Ashkenazi | |
| 9,280,442 B1 | 3/2016 | Nicolo | |

(Continued)

FOREIGN PATENT DOCUMENTS

| | | |
|---|---|---|
| CN | 109241740 A | 1/2019 |
| EP | 0786110 B1 | 8/2001 |

OTHER PUBLICATIONS

Hicks et al., "System Testing Infrastructure Using Combinatorics," U.S. Appl. No. 16/819,328, filed Mar. 16, 2020.

(Continued)

*Primary Examiner* — Joshua P Lottich
(74) *Attorney, Agent, or Firm* — Cantor Colburn LLP; Teddi Maranzano (57) ABSTRACT

A method for testing a system under test (SUT) in an active environment includes generating, by a testing system, a set of tests for testing the SUT, the tests generated based on a coverage model of the SUT, wherein the coverage model uses several attributes. The method further includes creating, by the testing system, a minimal set of tests from the generated tests by selecting tests for a disjoint set of attributes from the several attributes of the coverage model. The method further includes executing, by the testing system, the minimal set of tests on the SUT for analyzing a soft failure of the SUT in the active environment, wherein the soft failure occurs in the active environment during execution of the SUT based at least in part on a parameter of the active environment.

17 Claims, 7 Drawing Sheets

(56) References Cited

U.S. PATENT DOCUMENTS

| | | |
|---|---|---|
| 9,606,901 B1 | 3/2017 | Elgarat |
| 2005/0086246 A1 | 4/2005 | Wood et al. |
| 2005/0120274 A1 | 6/2005 | Haghighat et al. |
| 2007/0174023 A1 | 7/2007 | Bassin et al. |
| 2008/0046791 A1 | 2/2008 | Bicheno et al. |
| 2008/0065931 A1 | 3/2008 | Coulter et al. |
| 2008/0215921 A1 | 9/2008 | Branca et al. |
| 2009/0193389 A1* | 7/2009 | Miller ............... G06F 11/3684 717/104 |
| 2009/0265693 A1 | 10/2009 | Bakowski |
| 2010/0287534 A1 | 11/2010 | Vangala et al. |
| 2011/0145653 A1* | 6/2011 | Broadfoot ........... G06F 11/3604 714/38.1 |
| 2012/0060133 A1* | 3/2012 | Krishnan ............ G06F 30/3312 716/108 |
| 2013/0212435 A1 | 8/2013 | Qiu et al. |
| 2013/0339930 A1* | 12/2013 | Xu ...................... G06F 11/3684 717/125 |
| 2013/0346427 A1 | 12/2013 | Impink |
| 2014/0025997 A1* | 1/2014 | Heiper ............... G06F 11/3676 714/38.1 |
| 2014/0096113 A1 | 4/2014 | Kuehlmann et al. |
| 2014/0196011 A1 | 7/2014 | Bostick |
| 2015/0067648 A1 | 3/2015 | Sivanesan |
| 2015/0215331 A1 | 7/2015 | Mhatre |
| 2015/0339217 A1 | 11/2015 | Avgerinos |
| 2016/0217061 A1 | 7/2016 | Fulton et al. |
| 2016/0356851 A1 | 12/2016 | Furman |
| 2016/0357660 A1 | 12/2016 | Dean et al. |
| 2016/0378638 A1 | 12/2016 | Eilam et al. |
| 2017/0228307 A1* | 8/2017 | Edwards ............ G06F 11/3664 |
| 2018/0246803 A1 | 8/2018 | Zhang |
| 2019/0155717 A1* | 5/2019 | Hess .................... G06K 9/6215 |
| 2019/0163614 A1 | 5/2019 | Meliou et al. |
| 2019/0361799 A1* | 11/2019 | Wojciak ............. G06F 11/3684 |
| 2020/0073788 A1* | 3/2020 | Saha ................... G06F 11/3688 |
| 2020/0192789 A1 | 6/2020 | Peng et al. |
| 2020/0285570 A1* | 9/2020 | Knaack ............... G06F 11/3684 |
| 2021/0098299 A1 | 4/2021 | Holsteyns et al. |

OTHER PUBLICATIONS

Hicks et al., "System Testing Infrastructure for Detecting Soft Failure in Active Environment," U.S. Appl. No. 16/819,324, filed Mar. 16, 2020.

Hicks et al., "System Testing Infrastructure for Analyzing and Preventing Soft Failure in Active Environment," U.S. Appl. No. 16/819,321, filed Mar. 16, 2020.

Hicks et al., "Stress Test Impact Isolation and Mapping," U.S. Appl. No. 16/819,329, filed Mar. 16, 2020.

List of IBM Patents or Patent Applications Treated as Related; Date Filed: Mar. 17, 2020, 2 pages.

Ghandehari et al., "Identifying Failure-Inducing Cominations in a Combinatorial Test Set," IEEE Fifth International Conference on Software Testing, Verification and Validation Workshop on CT, 2012, 10 pages.

Kuhn et al., "Combinatorial Software Testing," Software Technologies, IEEE Computer Society, 2009, pp. 94-96.

Mailewa, "Reducing Software Testing Time with Combinatorial Testing and Test Automation," St. Cloud State University, Culminating Projects in Computer Science and Information Technology, Jun. 2015, 94 pages.

Maughan, "Test Case Generation Using Combinatorial Based Coverage for Rich Web Application," Utah State University, 2012, All Graduate Theses and Dissertations, 1405, 40 pages.

Sabharwal et al., "A novel approach for deriving interactions for combonatorial testing," Elsevier, Engineering Science and Technology, an International Journal, Jun. 27, 2016, pp. 59-71.

Harrell, "Orthogonal Array Testing Strategy (OATS) Technique," Seilevel, URL: http://www.51testing.com/ddimg/uploadsoft/20090113/OATSEN.pdf, Received: Sep. 23, 2021, 9 pages.

* cited by examiner

SYSTEM TESTING INFRASTRUCTURE FOR ANALYZING SOFT FAILURES IN ACTIVE ENVIRONMENT

BACKGROUND

The present invention relates to testing of a computer program and, more specifically, testing environmental conditions in a system on which the computer program is being executed to detect and analyze a soft failure in the environmental conditions.

Computerized devices control almost every aspect of our life—from writing documents to controlling traffic lights. However, computerized devices are often error-prone, and thus require a testing phase in which the errors should be discovered. The testing phase is considered one of the most difficult tasks in designing a computerized device. The cost of not discovering an error may be enormous, as the consequences of the error may be disastrous. Coverage tools for checking software provide a measure of how well the software being evaluated has been exercised during testing and thereby give a level of assurance that the software is of high quality.

SUMMARY

According to one or more embodiments of the present invention, a method for testing a system under test (SUT) in an active environment includes generating, by a testing system, a set of tests for testing the SUT, the tests generated based on a coverage model of the SUT, wherein the coverage model uses several attributes. The method further includes creating, by the testing system, a minimal set of tests from the generated tests by selecting tests for a disjoint set of attributes from the several attributes of the coverage model. The method further includes executing, by the testing system, the minimal set of tests on the SUT for analyzing a soft failure of the SUT in the active environment, wherein the soft failure occurs in the active environment during execution of the SUT based at least in part on a parameter of the active environment.

According to one or more embodiments of the present invention, a system includes a system under test (SUT) that is being executed in an active environment, and a testing system that performs a method for testing a system under test (SUT) in an active environment. The method includes generating, by a testing system, a set of tests for testing the SUT, the tests generated based on a coverage model of the SUT, wherein the coverage model uses several attributes. The method further includes creating, by the testing system, a minimal set of tests from the generated tests by selecting tests for a disjoint set of attributes from the several attributes of the coverage model. The method further includes executing, by the testing system, the minimal set of tests on the SUT for analyzing a soft failure of the SUT in the active environment, wherein the soft failure occurs in the active environment during execution of the SUT based at least in part on a parameter of the active environment.

According to one or more embodiments of the present invention, a computer program product includes a computer-readable storage medium having computer-executable instructions stored thereupon, which when executed by a processor cause the processor to perform a method for testing a system under test (SUT) in an active environment. The method includes generating, by a testing system, a set of tests for testing the SUT, the tests generated based on a coverage model of the SUT, wherein the coverage model uses several attributes. The method further includes creating, by the testing system, a minimal set of tests from the generated tests by selecting tests for a disjoint set of attributes from the several attributes of the coverage model. The method further includes executing, by the testing system, the minimal set of tests on the SUT for analyzing a soft failure of the SUT in the active environment, wherein the soft failure occurs in the active environment during execution of the SUT based at least in part on a parameter of the active environment.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

When testing a system (i.e., a system under test (SUT)), it is observed that some errors (also referred to herein as "bugs") are not surfaced consistently due to a requirement of specific environmental or timing circumstances. For example, in the case of a software SUT, the circumstances can include one or more parameters of a computer system on which the software is being executed. For example, the parameters can include settings of the computer system, other software being executed on the computer system, a hardware configuration of the computer system, and the like. In a similar manner, in the case of a hardware SUT, the configuration of a system of which the hardware SUT is a part of can affect the environmental conditions. In other words, particular errors in the SUT can be a result of the system state and not the quality of the SUT itself. Such errors are sometimes referred to as "soft failures." Identifying such conditions that can lead to soft failures is a technical challenge. Additionally, identifying the soft failures, i.e., determining that an error is a soft failure can also be a technical challenge.

Embodiments of the present invention address such technical challenges. According to one or more embodiments of the present invention, a minimal set of test cases for a SUT are executed on the system. It should be noted that the system is different than the SUT; the SUT is being executed using the system. The minimal set of test cases can be generated using combinatorics test designing (CTD). Errors can be identified based on a subset of tests that fail from that minimal set. Further, according to one or more embodiments of the present invention, inverse CTD is used to localize the fault in the system.

According to one or more embodiments of the present invention, CTD is performed with respect to an interaction requirement, such as a pair-wise interaction, n-tuple interaction, or any other. The test plan may provide for sufficient coverage tasks that assure that the interaction requirement is fulfilled. In some exemplary embodiments, test planning is based on a modeling of the test space using a functional coverage model. The test space can represent inputs, scenarios, configurations, the application's internal state, or any other aspect that might need to be tested. The functional coverage model may include a set of functional attributes. In other embodiments of the present invention, the coverage model can include one from a number of types of coverage known in the art, such as statement coverage, line coverage, condition coverage, path coverage, method coverage, and the like. The type of coverage does not affect identifying the soft failures.

Further, with respect to test planning, a test-space may define potential tests that may be executed on the SUT. A test can be associated with exactly one potential test, as opposed to coverage tasks. In some exemplary embodiments of the present invention, several different tests may hold the same potential test.

In some exemplary embodiments of the present invention, the motivation for the approach of CTD is that most bugs depend on the interaction between a small number of functional attributes. CTD algorithms may also deal with scalability issues. The CTD algorithms may assume that the combinations space is too large to be represented explicitly, and they use various techniques to try to generate an optimized test plan without explicitly enumerating all possible combinations. Examples of such algorithms may be a reduction to the orthogonal arrays or covering array problems. Those techniques are limited in the type of restrictions they allow on the value combinations, or in the type of requested interaction level, and still hit scalability issues as the number of model variables increases.

Despite these reduction efforts, once the SUT has been implemented, new features are typically requested and added as users exercise the functionality of the system. New test cases are created as the new features are added. Sets of test cases are, therefore, maintained for the SUT to ensure that previous functionality still works, that new functionality works and that the new functionality does not adversely affect the old functionality. These test case sets are termed regression test cases, and the activity of testing the SUT to ensure conformance with legacy requirements is typically termed regression testing.

Generally, at least some of the regression test case sets are created and maintained manually over the life of the SUT. They are manually selected based on the number of tests that can be run in an allotted amount of time, tests that exercise the most important features of the SUT, and tests that have historically exposed the greatest number of problems in the SUT when introducing new features, or other such reasons. A drawback of conventional regression testing is that some of the additional test cases repeat test actions that are covered by other test cases in the regression test case set. This is the penalty associated with the incremental addition of test cases. For a large, complex project, using the manual iterative method of adding test cases to the regression test case set can result in a large amount of duplicate test actions. Such technical challenges are also addressed by the technical solutions facilitated by embodiments of the present invention.

The technical challenges arise because without the ability to automatically regenerate the test set in response to changes made to the requirements, the testing effort proceeds inefficiently. Initially, it is possible to manually select a test set that is close to the optimal set of test cases from a small requirements model. The requirements model, however, grows as new features and capabilities are added to the SUT. Once the requirement model is large, manually selecting a close to an optimal set of test cases is technically challenging, if not impossible. In one known method, the original set of test cases is augmented with test cases that exercise the new parts of the requirements model. Over time, using this approach, there will be extensive redundancy between the test cases. The same scenarios or scenario fragments are included in a large proportion of the test cases. Other scenarios and scenario fragments will be ignored entirely and will not be included in any test case. Overall, there will be a large number of test cases, far more than necessary for coverage, and the coverage achieved by this large test set will be poor. Thus, a further technical challenge is to reduce this redundancy by removing test cases that cover identical execution paths. As described further, embodiments of the present invention address such technical challenges.

Figure 1:
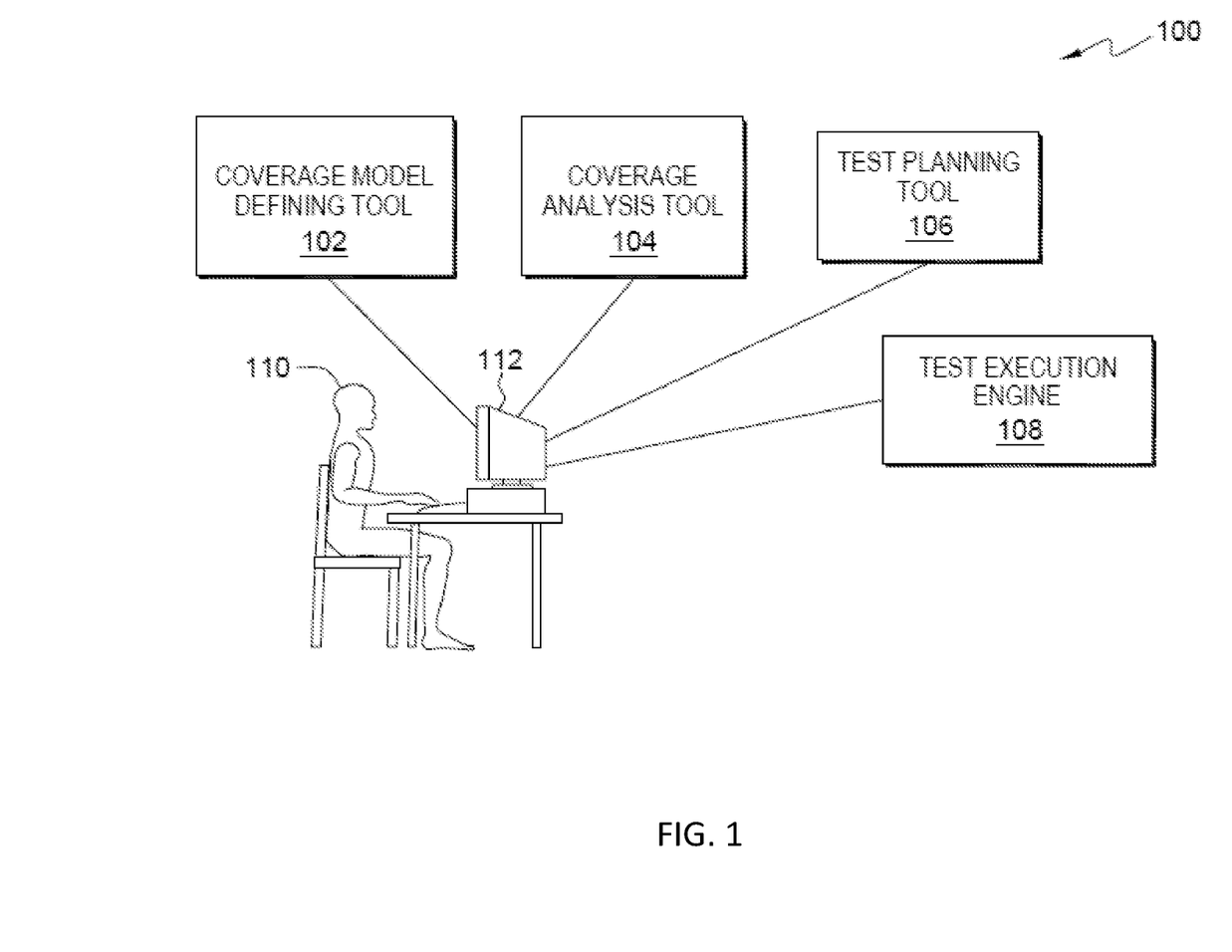
FIG. 1 shows a schematic illustration of a computerized environment in accordance with one or more embodiments of the present invention.

Referring now to FIG. 1, showing a schematic illustration of a computerized environment in accordance with embodiments of the present invention. A computerized environment 100 may include one or more computerized tools. It should be noted that the depiction is one possible example of a block diagram and that some components may not be depicted for clarity.

In one or more embodiments of the present invention, a user 110, such as a developer, a QA staff member, a tester, a designer, a verification engineer or the like, may interact with the computerized environment 100. The user 110 may utilize a Man-Machine Interface (MMI) 112 such as a terminal, a display, a keyboard, an input device or the like.

In some exemplary embodiments of the present invention, a coverage model defining tool 102 may be utilized to define the test coverage model, such as a functional coverage model, or the like. In some exemplary embodiments of the present invention, the user 110 may define the attributes that are to be tested, for example, the functional attributes in case a functional coverage is being tested. In some exemplary embodiments of the present invention, a similar tool may be utilized to define a test-space. In some exemplary embodiments, the coverage model may be adapted to be utilized as a test model.

In some exemplary embodiments of the present invention, a test execution engine 108 may be utilized to test the SUT. It will be noted that the SUT may be hardware, firmware, software, combination thereof, or any other type of computerized device. The test execution engine 108 may be a simulation-based verification tool, a test-generation platform, or the like. The test execution engine 108 may be operatively coupled to a test planning tool 106 and configured to perform testing in accordance with the test plan. In some exemplary embodiments, the test planning tool 106 may provide the tests for the test execution engine 108 to perform. It will be noted that dynamic verification is a broader concept than testing the SUT, and it further includes test planning, coverage analysis and the like. The test execution engine 108 provides only one aspect of the entire scope of operations that may be performed during dynamic verification and should not be used to construe the term "dynamic verification" narrowly.

In some exemplary embodiments of the present invention, a coverage analysis tool 104 is configured to measure coverage of the test space for the SUT based on the dynamic verification performed by the test execution engine 108. For example, the coverage analysis tool 104 can be a functional coverage analysis tool. The coverage analysis tool 104 provides a coverage measurement, such as a portion of the coverage test-space or of the defined test plan, indicative of coverage tasks that were covered during dynamic verification performed by the test execution engine 108. The user 110 may review the coverage measurement and/or the list of covered tasks.

In some exemplary embodiments of the present invention, a test planning tool 106 may define a test plan to be covered. In some exemplary embodiments of the present invention, the test plan may be a set of coverage tasks to be covered. In some exemplary embodiments of the present invention, the test plan tool 106 may provide tests that are likely to cover the test plan, such as based on a test benchmark stored in a datastore which includes tests that are known/estimated to cover specific aspects of the SUT. As another example, the test plan tool 106 is configured to generate tests so as to cover coverage tasks. The user 110 may review the test plan, the selected test or the like. In some exemplary embodiments of the present invention, the user 110 may provide parameters for the test planning tool 106 to use in determining the objective of the test plan, such as a desired interaction level. Embodiments of the present invention enable the elimination of any redundancy in the generated tests.

While the depiction in FIG. 1 has been described with specific components including the coverage model defining tool 102, coverage analysis tool 104, test planning tool 106 and the test execution engine 108, embodiments of the present invention are not limited to these components or system configurations and can be implemented with other system configuration employing fewer or additional components.

Figure 2:
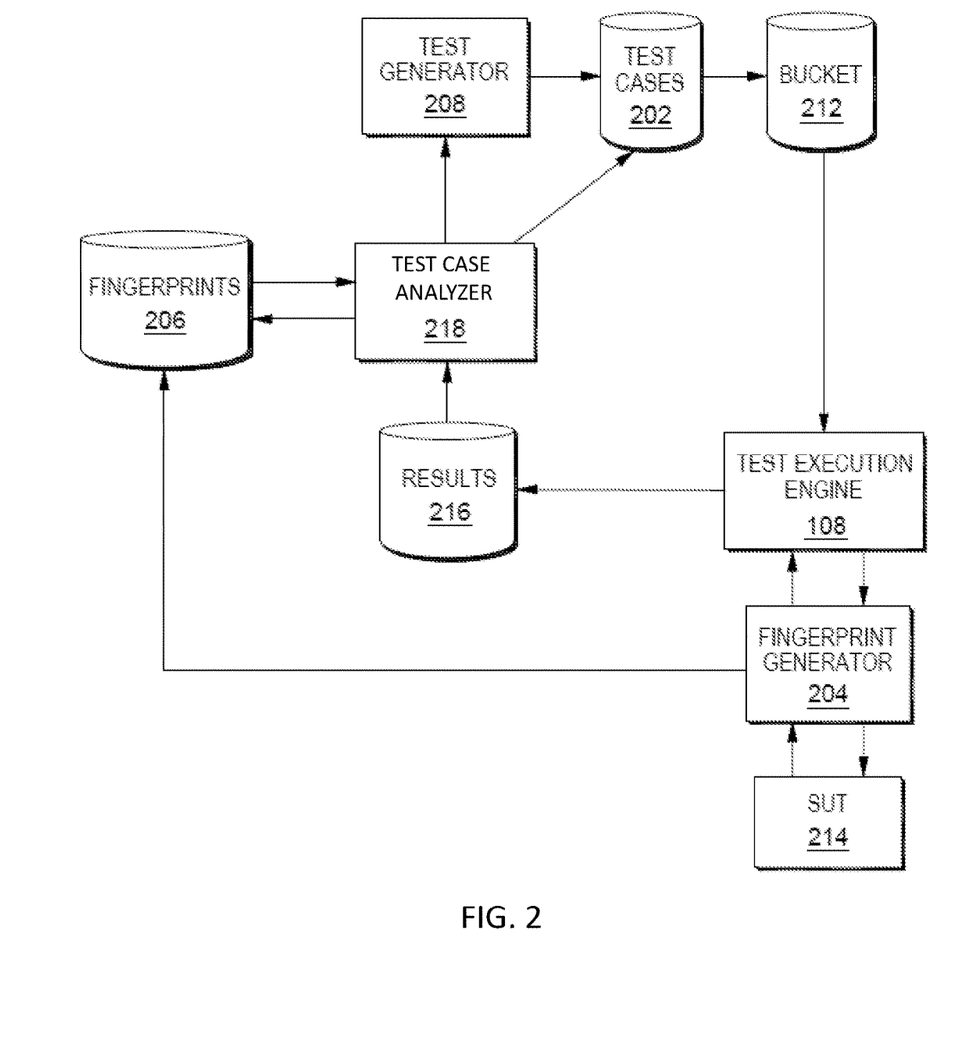
FIG. 2 is a block diagram representing modules providing a testing infrastructure according to an embodiment of the invention.

FIG. 2 is a block diagram representing modules providing a testing infrastructure according to an embodiment of the invention. More specifically, the infrastructure includes a test generator 208. The test generator 208 accesses a test infrastructure, such as a repository of test cases 202, which stores suites of test cases available to verify the correctness of the SUT 214. Each test case specifies an input to be applied to the SUT 214 and the expected response that should be returned in response to this input (to indicate its correct operation). Typically, the test cases are organized into sets (test suites), for example, each test suite for a different component of the SUT 214.

The test generator 208 creates an execution bucket for each run of the test on the SUT 214. The bucket specifies the operations to be performed for running the desired test cases in a machine-readable language (such as XML-based). Particularly, in the case of a complete test, all the available test cases are executed on each component of the SUT 214; conversely, in the case of a regression test, the execution is limited to a subset of selected test cases. The bucket so obtained can be saved into a file.

A test execution engine 108 controls the execution of the bucket read from the file. For each test case of the bucket, this involves the application of the corresponding input to the SUT 214. In response thereto, the SUT 214 returns a corresponding output to the test execution engine 108. The test execution engine 108 determines the result of the test case by comparing its output with the corresponding expected response (extracted from the file, for example). The result of the test case (i.e., positive when the two values match and negative otherwise) is saved into a log. For example, this may be achieved by means of a standard Test Tracking Tool (TTT). The results of the (current) run of the test are available in the log for their analysis.

For a large, complex SUT 214, the test case infrastructure 202 can contain a large amount of duplicate test actions/test cases. In accordance with certain embodiments of the present invention, one technique developed to address these challenges incorporates the use of a fingerprint repository 206 with a store of information including a set of fingerprints that correspond to a plurality of regression tests stored in the test repository 202. In one embodiment, the fingerprints are generated by a fingerprint generator 204. For instance, the fingerprint repository 206 can include fingerprints of most, if not all, of the tests stored in the test repository 202 and a reference to where copies of the test are located throughout the test infrastructure, similar to an index in a book. Each fingerprint uniquely identifies a specific code path covered by a corresponding test case. In this manner, the system can identify fingerprints (and corresponding tests) that are redundant, and in some cases duplicate.

According to embodiments of the present invention, processing of the results 216 of the regression tests generated by the test generator 208 and executed by the test execution engine 108 may include determination of a code path traversed during execution of each generated regression test and generation of a fingerprint for each executed regression test based at least in part on the code path. In some embodiments of the present invention, these steps may be performed by the fingerprint generator 204.

A test case analyzer 218 analyzes the test cases 202 to identify particular traits in the test cases 202. The test case analyzer 218 can select and/or deselect particular test cases 202 for execution. The selection can be based on one or more factors, such as, redundancy, bypassing testing of particular portion of the SUT, bypassing testing of particular attributes, etc.

For example, to determine if any of the test cases 202 can be bypassed, the test case analyzer 218 compares fingerprints, source code of the test cases 202, the attribute-value pairs being used by the test cases 202, or any other such factors to identify redundancy. For example, the fingerprints corresponding to all test cases generated by the test generator 208 to a plurality of fingerprints stored in the fingerprint repository 206. The test case analyzer 218 provides a list of the regression test cases generated by the test generator 208 that have matching fingerprints with one or more fingerprints stored in the fingerprint repository 206, i.e., redundant test cases. This information is used to select and discard the duplicate test cases from the test repository 202 (as described below). Alternatively, or in addition, the test case analyzer 218 compares the code in the test cases 202 to determine test cases 202 that have similar source code, and hence, that test similar portions of the SUT. Alternatively, or in addition, the test analyzer 218 compares the attribute-value pairs being used by the test cases 202. The test cases 202 that compare the same attribute-value pairs may be reduced in one or more embodiments of the present invention. In other embodiments of the present invention other factors can be used to identify redundancy. Comparison/matching of such information can be performed using known techniques, such as text comparison, code comparison, semantic analysis, etc.

In one or more embodiments of the present invention, the test case analyzer 218 identifies the most disjoint set of test cases 202 to cover the edges of the test space before (or after) narrowing in on the fault(s) in the environment 100. A minimal set of tests (described further herein) is such a disjoint set of tests to identify edge cases during execution of the SUT, which helps diagnose soft failure(s) in the testing environment (rather than a fault in the SUT itself).

Figure 3:
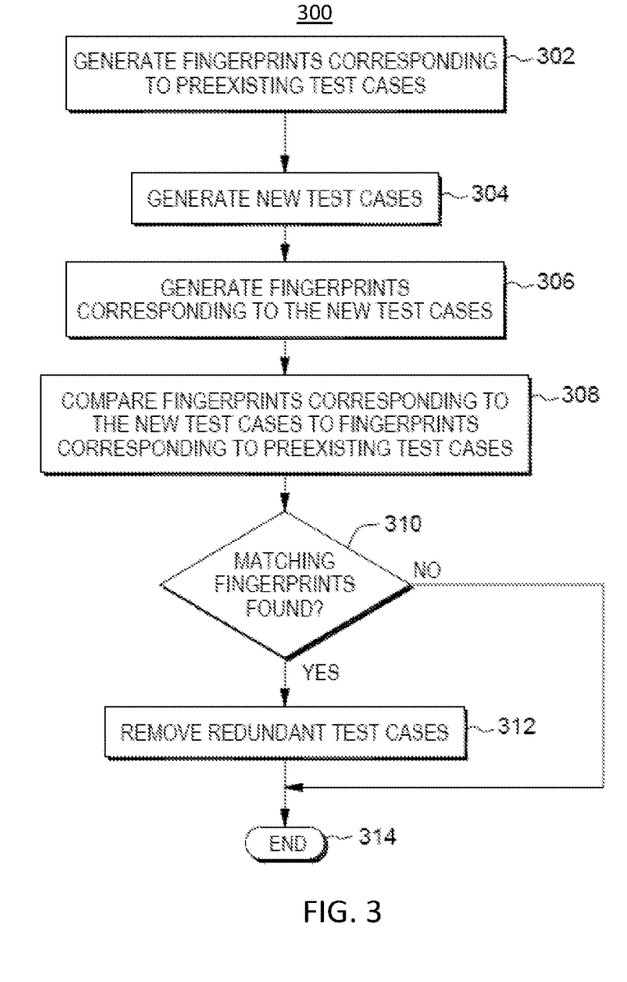
FIG. 3 shows a flowchart of a method for reducing test cases by eliminating redundant tests, in accordance with one or more embodiments of the present invention.

FIG. 3 shows a flowchart of a method 300 for reducing test cases by eliminating redundant tests, in accordance with embodiments of the present invention. It should be noted that each operation of the method 300 depicted in FIG. 3 can be performed by one or more of the modules or the like depicted in FIG. 1, or FIG. 2, whose operation will be described in more detail hereinafter. These program modules may be implemented in any combination of hardware, software, and/or firmware. In certain example embodiments of the present invention, one or more of these program modules may be implemented, at least in part, as software and/or firmware modules that include computer-executable instructions that when executed by a processing circuit cause one or more operations to be performed. A system or device described herein as being configured to implement example embodiments of the present invention may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

At block 302, the fingerprint generator 204 may generate fingerprints for each respective test that has been run on the SUT 214. The fingerprint generator 204 may retrieve the preexisting regression tests from one or more datastores, such as test repository 202. In example embodiments of the present invention, these preexisting regression tests may have been executed on source code, which may also be retrieved from the test repository 202. In example embodiments of the present invention, inputs to the source code to be tested may be modeled as a collection of attribute-value pairs. As such, in certain example embodiments, each regression test case may be a test case to test the operation of the source code of the SUT 214 with respect to a particular combination of attribute values. In example embodiments of the present invention, the fingerprint generator 204 may generate fingerprints for each executed regression test based at least in part on the code path traversed by the source code covered by the corresponding test case.

At block 304, the test generator 208 may generate one or more tests (e.g., a set of regression tests) to run on the SUT 214. In one embodiment, the test generator 208 may utilize CTD to determine a set of tests to be executed. In one embodiment, the test generator 208 may be given a description of a test space in the form of variables, their respective values, and possibly restrictions on the values combinations. In one exemplary embodiment, the test generator 208 may select a subset of the possible tests that ensures coverage of all valid combinations of every two attributes (or every three, or four, etc.). Many tools and algorithms exist for CTD such as those disclosed in Grindal, M., Offutt, J., Andler, S. F. "Combination testing strategies: a survey". Softw. Test, Verif. Reliab 15(3), 167-199 (2005), and the disclosed embodiment may utilize any of one of them.

In one or more embodiments of the present invention, the test generation may be performed by selecting a subset of the tests that would maintain 100% n-wise coverage with respect to the tested test space, and therefore maintaining the n-wise coverage metric with respect to the valid test space. In some exemplary embodiments of the present invention, at block 304, the coverage analysis tool 104 may be operative to determine a subset of the possible combinations of values. The subset of the possible combinations of values is with respect to the covered test space defined by the coverage model determined by the coverage model defining tool 102. The most common criterion for test selection is code coverage, i.e., select a subset of the tests that cover code that has recently changed, for example. As noted earlier, the coverage model can be functional code coverage model.

According to one or more embodiments of the present invention, at block 306, after the test execution engine 108 executes the generated tests, the fingerprint generator 204 generates fingerprints corresponding to the executed tests. For example, each fingerprint uniquely identifies the code path traversed during execution of a corresponding regression test. In some exemplary embodiments of the present invention, the fingerprint generation algorithm employed by the fingerprint generator 204 generates a fingerprint that identifies not only the breakpoints encountered during traversal of a code path and the number of times each such breakpoint is encountered, but also the order in which the encounters occur. Thus, if execution of two different regression tests results in code paths that encounter the same breakpoints the same number of times but in different orders, the respective fingerprint generated for each regression test will uniquely identify the particular order in which breakpoint encounters occur for that regression test.

At block 308, the test case analyzer 218 compares the fingerprints generated at block 306 with a plurality of fingerprints stored in the fingerprints repository 206. The test case analyzer 218 attempts to find exact matches. As a non-limiting example, if the fingerprint generator 204 employs a string-based algorithm and generates the fingerprint <ABABCDCDE> for a corresponding regression test, at block 308 the test case analyzer 218 determines whether there are any <ABABCDCDE> fingerprints in the fingerprints repository 206. It should be noted, each element of the string <ABABCDCDE> identifies a corresponding breakpoint that is encountered; the number of times that the same element appears in the string indicates the number of times the corresponding breakpoint is encountered; and the ordering of the elements in the string indicates the order in which the breakpoints are encountered. Once the test case analyzer 218 identifies matching fingerprints, it also identifies corresponding test cases stored in the test repository 202 based on the identified fingerprint information. It should be noted that in other embodiments of the invention, the fingerprint is represented using other format, such as a hash key, or any other format.

If the test case analyzer 218 finds no matching fingerprints (decision block 310, No branch), the disclosed method ends at block 314. Responsive to finding one or more matching fingerprints (decision block 310, Yes branch), at block 312, the test case analyzer 218 removes the redundant test cases associated with the matching fingerprint from the test repository 202. In other words, if one or more of older test case is associated with a fingerprint that matches the fingerprint of one of the newer generated CTD tests, then the older case can be removed from the test repository 202. This reduction of redundant test cases advantageously alleviates maintenance requirements on the test infrastructure as older test cases are gradually cycled out.

However, even such a reduced set of tests cannot be used on a "live" environment 100, such as in an active data center that is being used by consumers/customers. The live environment is not a "clean" environment as discussed earlier, and in one or more embodiments of the present invention, the live environment is one in which soft failures are being experienced. Hence, to address the technical challenges, in one or more embodiments of the present invention, the reduced set of tests is further reduced so that a minimal set of test cases can be used to test the live environment 100. This minimal set is even more reduced than a typical pairwise reduction set. In an environment that experiences soft failures, embodiments of the present invention treat all services as being in a fragile state. Hence, embodiments of the present invention use the minimal set of tests, instead of the pairwise tests, to facilitate identifying the fault(s) that are causing the soft failures and repairing the fault(s) instead of further stressing the environment 100 and causing it to fail completely (crashing).

The pairwise tests have an overlap between the various attributes to cover as much of the test space as possible in the fewest set of tests. In other words, the pairwise tests that are generated (at block 314) include tests that have an overlap between attributes being tested so as to maximize test space coverage. Instead, when diagnosing the soft failures, embodiments of the present invention facilitate using the most disjoint set of tests to cover the edges of the test space first before narrowing in on the fault(s) in the environment 100. The minimal set of tests provides such disjoint set of tests. This is analogous to a doctor examining a patient to identify likely sources for their ailments.

Figure 4:
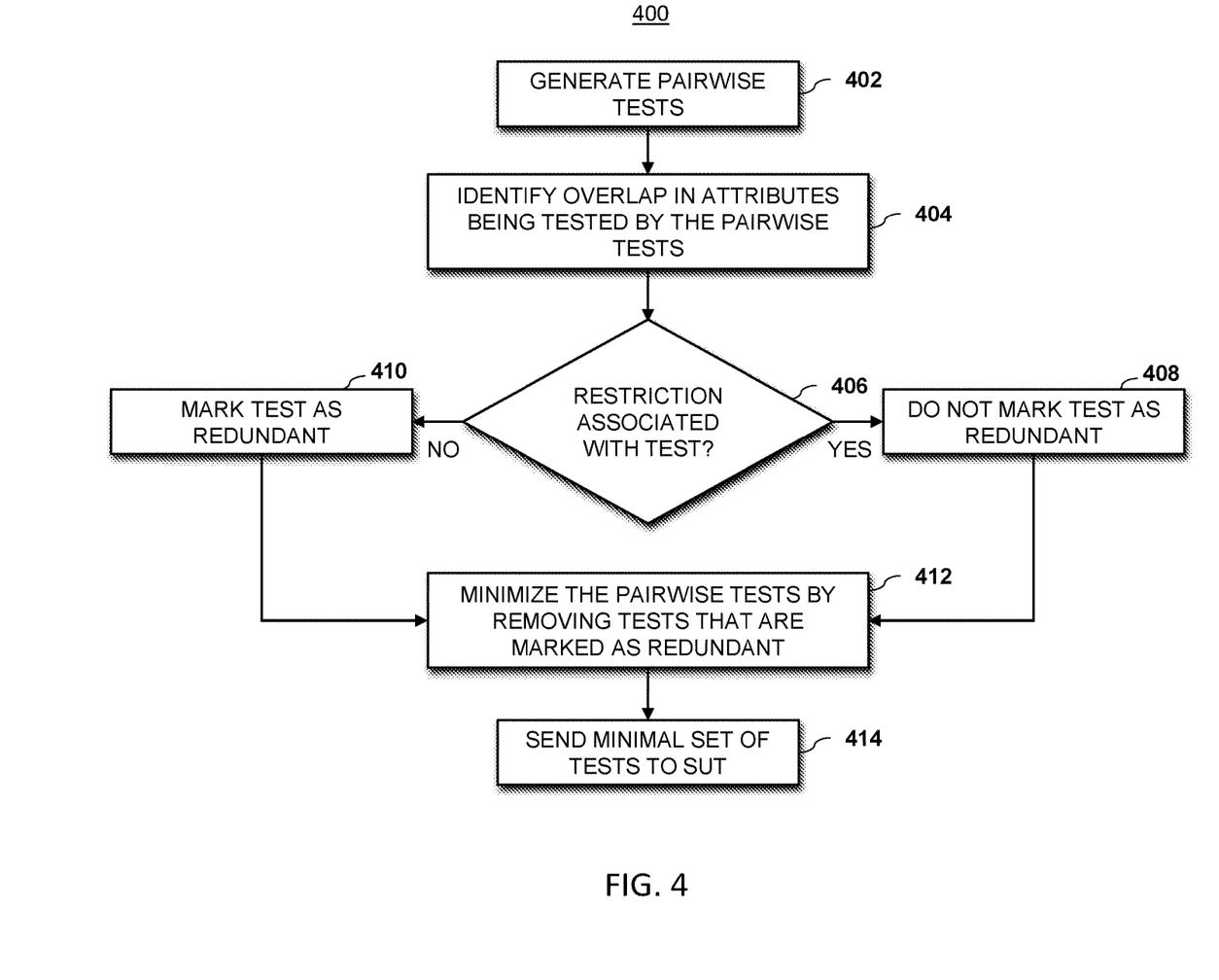
FIG. 4 depicts a flowchart of a method for generating a minimal set of tests for diagnosing portions of a system that are causing soft failures when executing a system under test according to one or more embodiments of the present invention.

FIG. 4 depicts a flowchart of a method 400 for generating a minimal set of tests for diagnosing portions of a system that are causing soft failures when executing a SUT according to one or more embodiments of the present invention. The method 400 includes generating attribute-value pairwise tests for the SUT 214, at block 402. The pairwise tests can be generated using CTD in one or more embodiments of the present invention. Any other technique can be used for generating the pairwise tests. In one or more embodiments of the present invention, generating the tests includes selecting a reduced set of the pairwise tests to provide maximum test coverage for the SUT 214.

The attribute-value pairs that are used by the reduced set of tests include overlap. For example, a first test can test attributes A-B, a second test can test attributes B-C, a third test can test attributes C-D, etc. Here, A, B, C, and D, are attributes of the SUT 214.

The method 400 further includes identifying overlap/redundancies in the attributes being tested, at block 404. In one or more embodiments of the present invention, the identified tests are marked as redundant tests. In one or more embodiments of the present invention, an orthogonal Cartesian selection using abatement and pair correlation can be used to identify the redundant tests from the pairwise tests that are generated for testing the entire test space. For example, in the above example, the second test that tests attributes B-C is identified as being redundant because the first and the third tests facilitate testing the attributes A, B, C, and D. Accordingly, the method 400 includes identifying tests in the reduced set of tests that exercise the same attributes of the SUT 214. If two tests, a first test and a second test, both, exercise at least one common attribute, one of the two tests is marked as a redundant test at block 410. Marking the test as redundant can include including a unique identifier of the test, (for example, an index, a hash etc.) in a list of redundant tests. Alternatively, a list of non-redundant tests can be maintained in a similar manner.

In one or more embodiments of the present invention, prior to marking a test as a redundant test, the method 400 further includes determining if there are any restrictions that prevent marking the test as a redundant test, at block 406. For example, a restriction can exist for testing the SUT 214 such that a particular test has to be executed for another particular test to be executed. For example, in a scenario with the above set of tests may be that the third test (for attributes C-D) can only be executed if the second test (for attributes B-C) is executed. Accordingly, in this case, the second test cannot be marked as a redundant test. The restriction can arise, for example, based on a state of the SUT 214 after executing the second test that may be a prerequisite for executing the third test. It is understood that the above is just one example, and that in other embodiments of the present invention, other types of restrictions can exist.

Accordingly, referring to the flowchart, if a restriction is determined with a test that was identified as a redundant test, that test is not marked as a redundant test, at block 408. Alternatively, if it is determined that a restriction does not exist, the test is marked as a redundant test, at block 410.

The method 400 includes minimizing the reduced set of test cases further by eliminating the redundant tests, at block 412. Minimizing the reduced set of test cases includes generating another set of tests that includes all of the tests from the reduced set of tests except the tests that are marked as the redundant tests. The method further includes sending the minimal set of tests to the SUT 214 for execution, at block 414. The SUT 214 executes the minimal set of tests.

Figure 5:
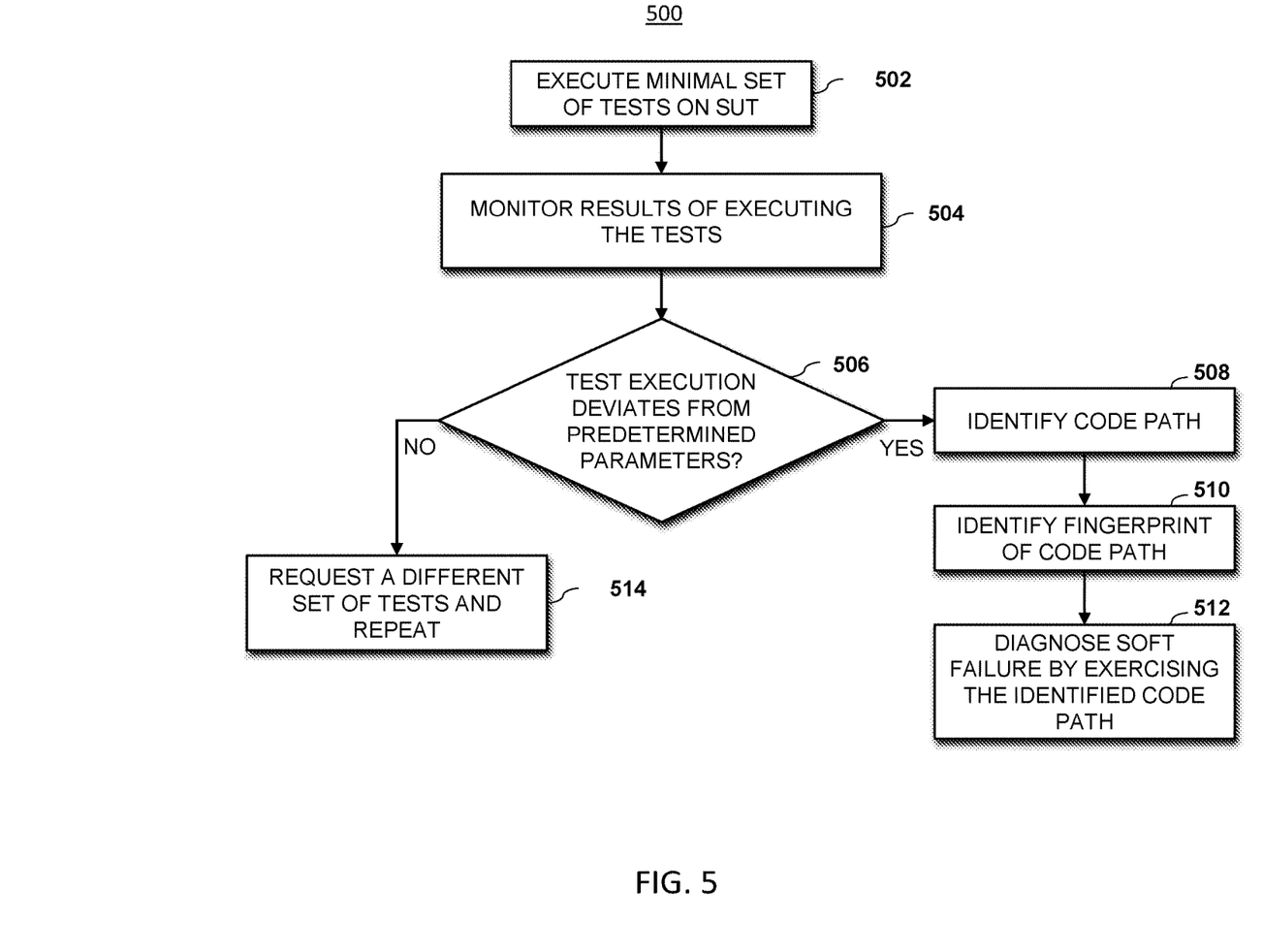
FIG. 5 depicts a flowchart of a method for executing the minimal set of tests for the system under test to detect soft failures, according to one or more embodiments of the present invention.

FIG. 5 depicts a flowchart of a method 500 for executing the minimal set of tests for the SUT to detect soft failures according to one or more embodiments of the present invention. In one or more embodiments of the present invention, the test execution engine 108 executes the minimal tests on the SUT 214, at block 502. The test execution engine 108 monitors the results of the execution, at block 504.

If the test execution engine 108 detects that execution of a test from the minimal set of tests deviates from an expected set of parameters ("YES" at block 506), the test execution engine 108 identifies a code path associated with the test, at blocks 506 and 508. For example, the deviation can be a different amount of time required for executing the test compared to a predetermined time associated with the test. The predetermined time that is associated with the test can be based on a duration it takes to execute that test in a clean system that can be maintained by the developer of the SUT 214, in one or more examples.

According to one or more embodiments of the present invention, the fingerprint generator 204 keeps track of an execution time of each test. For example, the fingerprint generator 204 measures the execution time of each test in a "clean" environment 100. Here, the clean environment represents a known system in which the soft failures are not experienced, for example, a computer system that is maintained by the developer of the SUT 214. It is understood that in other embodiments of the present invention, the execution time can be tracked by some other module than the fingerprint generator 204.

In environments where soft failures are experienced, timing window based errors can be used to detect the cause of the soft failures according to one or more embodiments of the present invention. A timing window is a sequence in time in which multiple events are occurring simultaneously. Recreating a specific timing window to diagnose an error can be extremely difficult, if not impossible, when the events that occurred create or exist in the execution environment 100 with a lot of entropy. In some cases, investigating a given error directly alters the execution time of various events. This can obscure the root cause of the problem or create additional problems that do not generally occur in the environment 100, such as resource contention. By monitoring the execution time of the tests, particularly the minimal set of tests that exercise disjoint code paths of the SUT 214, one or more embodiments of the present invention facilitate identifying specific code paths that cause the soft failure in the environment 100. The specific code paths, which are accordingly identified, can be further exercised to diagnose the soft failure(s) and to possibly determine a solution(s) to the soft failure(s).

If a given test with a known execution time in a healthy/clean environment runs slower or faster (than the known execution time) in the active environment 100, the portions of the SUT 214 exercised by the test can be identified. For example, the exercised portion can be identified using a code flow technology such as break point fingerprints. If the test fails during the diagnosis phase, inverse CTD can be employed to further define the scope of the detected error. The set of errors and timing deltas that are identified can further identify suspicious or portions of the SUT 214 that may be causing the soft failure(s).

Other deviations, than those in execution time, can also be monitored by the test execution engine. Such other deviations include a different value of the attribute being exercised by the test after execution of the test is complete. Alternatively, or in addition, deviations can include a different memory location being used during execution of the test compared to a memory location used by the test in the clean system. It is understood that other types of deviation can be detected in other embodiments of the present invention and the above provided examples are just a possible subset of deviations.

Once the deviation is detected, in one or more embodiments of the present invention, the test execution engine 108 performs an analysis to identify a particular code path ("code path") that is executed by the test that resulted in the deviation. The sequence in which statements or events in the test are performed can depend on particular values associated with particular variables. As part of this analysis, the test execution engine 108 determines under what specific circumstances program control of the SUT 214 flows through the code path. For example, the test execution engine 108 may determine the last decision branch in the SUT 214 that was taken to drive the code path. Such a decision branch may be associated with a particular breakpoint, as discussed below.

At block 510 of the method 500, the test execution engine 108 determines which breakpoints are encountered during execution of the code path and the number of times each such breakpoint is encountered as well as, potentially, an order in which the breakpoints are encountered. In addition, at block 510, the test execution engine 108 may determine the fingerprint for the code path based at least in part on the identified execution code path and the assigned breakpoint values.

The fingerprint of the identified code path is stored in one or more examples. Further, the stored code paths can be communicated to the development/testing team of the SUT 214 to analyze the code paths and determine cause/solution for the soft failures experienced by the live system when executing the minimal set of tests. The method can further include generating and sending tests to further exercise the identified code path in the live environment 100 as well as the clean environment, at block 512. Generating such tests can include selecting, from the reduced set of tests (FIG. 3), a subset of tests that are associated with the identified fingerprint.

In one or more embodiments of the present invention, the identified code path is not executed in the environment 100. For example, if and when the SUT 214, during execution, reaches the identified code path, the SUT 214 can terminate execution, instead of causing the soft failure. Alternatively, or in addition, in one or more embodiments of the present invention, the SUT 214 may prompt a user for instructions upon reaching the identified code path and proceed as per the user instructions. In one embodiment of the present invention, the user's feedback may indicate instructions/alternative course of actions with respect to averting the detected code path. The provided instructions may include but are not limited to an alternative code path for the SUT 214 to use.

If the test execution of all the tests in the minimal set of tests does not deviate from the execution on the clean system, that is, the execution is according to respective set of predetermined parameters ("NO" at block 506), the test execution engine 108 requests a different minimal set of tests to be generated, at block 514. The method 500 is then repeated using the different minimal set of tests. For example, the different minimal set of tests can include tests that were eliminated in the earlier iteration of selecting the minimal set of tests. For example, tests that were marked as redundant are included in the different minimal set of tests being generated. In one or more embodiments of the present invention, a predetermined number of repetitions are performed. Alternatively, or in addition, if a different minimal set of tests cannot be generated (all options exhausted), the method 500 is not repeated.

Embodiments of the present invention accordingly address the technical challenges to identify and repair causes of soft failures in an active environment, where the SUT 214 is being used as a live system. Embodiments of the present invention can also facilitate restoring the health of the SUT 214 in case of such soft failures. If such diagnosis and repair is done incorrectly or too slowly, the SUT 214 can face additional failures and in some cases a complete shutdown instead. Such additional failures can cause customers/users of the SUT 214 to experience service outages or loss of data, which can adversely affect revenues and/or reputation of a client or company that is providing the SUT 214. By using the minimal set of tests as described herein, embodiments of the present invention facilitate diagnosing, without causing resource contention, areas of the live environment 100 that may be causing the soft failures.

In one or more embodiments of the present invention, once the affected areas are identified, the coverage analysis tool 104 calculates code coverage using flow technologies such as fingerprinting, e.g. using the break point fingerprints. In one or more embodiments of the present invention the coverage analysis tool 104 calculates the code coverage by comparing the flows exercised by the minima set of tests against a database of existing predetermined flows for the SUT 214. For example, the developers of the SUT 214 identify the predetermined flows in the clean environment.

The comparison of the code paths exercised by the minimal set of tests and the predetermined code paths facilitates identifying specific lines of code in the SUT 214, where the specific lines of code contribute to the symptoms/cause of the soft failure. For example, the comparison of the code paths can include determining which branch-points and/or breakpoints in the SUT 214 are exercised by the minimal set of tests. The coverage analysis tool 104 can identify the specific lines/portions of the code of the SUT 214 that are exercised by the minimal set of tests by identifying the branch-points and/or the breakpoints.

The identified portions of the code are communicated to the developers. For example, the filenames, line numbers, and other identifiers associated with the portions of the code are provided to the developers. The developers can develop a patch or strategy to alleviate the symptoms of the ailing SUT 214 and restore its health in the live environment 100 based on the identified code portions. In one or more embodiments of the present invention, the developers can update the SUT 214 to prevent execution of the identified portions of the code. For example, a patch/update for the SUT 214 can cause the SUT 214 to stop execution and prompt a user to select an alternative execution path upon reaching the code path that is marked by the minimal set of test cases. Alternatively, the SUT 214 can be updated to automatically select an alternative code path that is not marked as causing a soft failure. For example, if a code path of the SUT 214 originally included allocating a memory buffer of a particular size, and if that code path is marked as leading to a soft failure, the updated SUT 214 can prevent execution of the code path altogether. Alternatively, the updated SUT 214 can include an alternative code path that first checks that the requested buffer size is available and only if sufficient memory is available, the memory allocation is performed. It is understood that the above is just one of several possible examples of updating the SUT 214 to prevent/bypass a marked code path.

In one or more embodiments of the present invention the developers can diagnose the cause of the soft failure by maximizing a number of flows to maximize the coverage of tests in the identified portion of code. As noted herein, to minimize interruption to the live environment 100, ideally, it is beneficial to execute the smallest possible number of tests. Accordingly, a second minimal set of tests is generated, which is directed only to the identified portion of the SUT 214.

Figure 6:
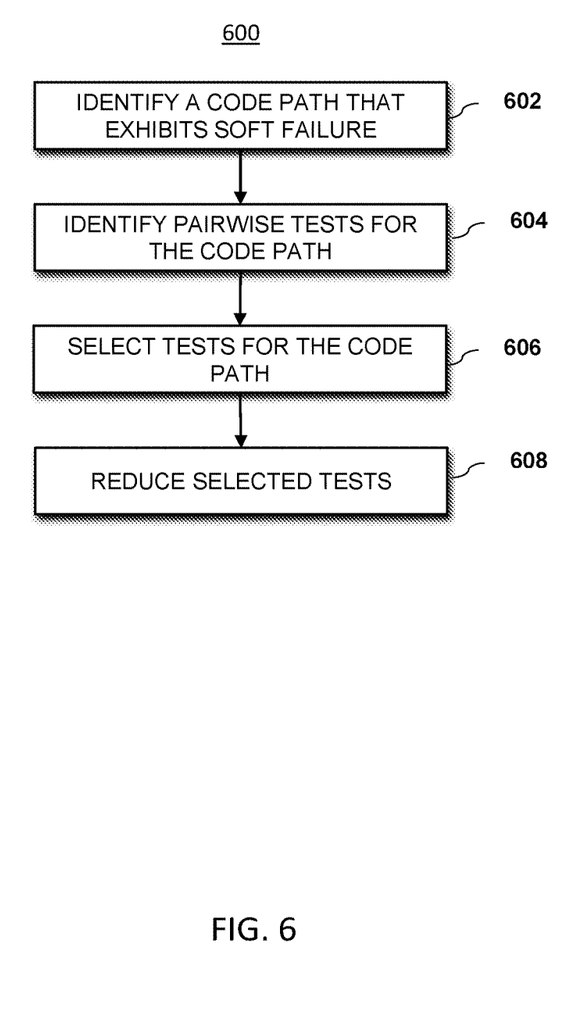
FIG. 6 depicts a flowchart of a method for exercising a specific portion of a system under test according to one or more embodiments of the present invention.

FIG. 6 depicts a flowchart of a method 600 for exercising a specific portion of an SUT according to one or more embodiments of the present invention. The method 600 includes identifying a code path that exhibits the soft failure in the live environment 100, at block 602. The code path is identified using the minimal set of tests as described herein, in one or more embodiments of the present invention. Alternatively, or in addition, the code path can be identified by receiving an input from a developer/personnel, where the input is indicative of the code path that is to be exercised.

The method 600 further includes identifying pairwise tests 202 that are associated with the code path, at block 604. The pairwise tests are identified using the fingerprints of the tests. For example, the fingerprint of the code path is compared with those of pairwise tests 202. If the fingerprint of the code path exists in the fingerprint of a test, that test is identified as being associated with the code path. The fingerprint of the code path is included in that of the test if the test exercises that code path. The identified tests are included in a set of selected tests, at block 606. In one or more embodiments of the present invention, a test is included in the set of selected tests by including a unique identifier of the test in a list of tests, which represents the set of selected tests.

The set of selected tests is further reduced to generate a reduced set of tests for the identified portion of the SUT 214, at block 608. In one or more examples, the reduction is performed if the number of tests in the set of selected tests is above a predetermined threshold. Such selected tests are executed by the test execution engine 108 and the results are monitored to diagnose a cause of the soft failure. Further, in one or more embodiments of the present invention a solution to avoid the soft failure can also be determined and the SUT 214 modified according to the solution.

Additionally, the extra diagnostic and logistical information collected from testing SUT 214 is used to enhance existing and new systems of the same type as the SUT 214 to immunize those systems from the same symptoms. This is analogous to a doctor finding a cure and vaccinating others to reduce or eradicate an illness.

Figure 7:
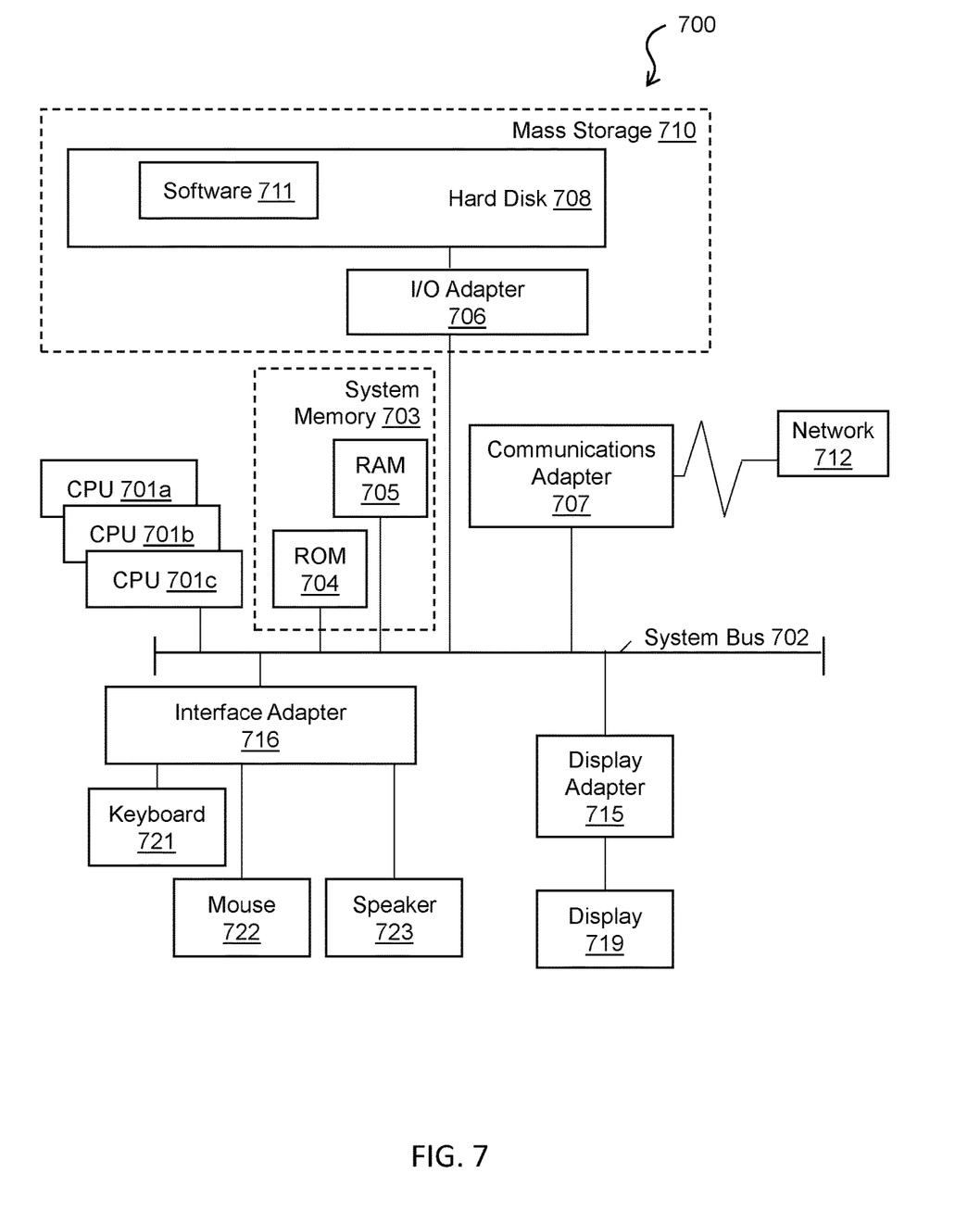
FIG. 7 depicts a computer system that may be used in one or more embodiments of the present invention.

Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments. In one or more embodiments of the present invention, the computer system 700 can be the environment 100 with the SUT being a computer program or a hardware component being used by the computer system 700. In one or more embodiments of the present invention, the computer system 700 can be the SUT 214, which is part of a server cluster.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission medium (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A method for testing a system under test (SUT) in an active environment, the method comprising:
   generating, by a testing system, a plurality of tests for testing the SUT, the plurality of tests generated based on a coverage model of the SUT, wherein the coverage model comprises a plurality of attributes;
   creating, by the testing system, a minimal set of tests from the plurality of tests by selecting tests for a disjoint set of attributes from the plurality of attributes of the coverage model, wherein creating the minimal set of tests comprises:
      identifying, by the testing system, from the plurality of tests, a pair of tests that both test a first attribute of the coverage model; and
      marking, by the testing system, a first test from the pair of tests as a redundant test, and selecting, in the minimal set of tests, a second test that is not redundant; and
   executing, by the testing system, the minimal set of tests on the SUT for analyzing a soft failure of the SUT in the active environment, wherein the soft failure occurs in the active environment during execution of the SUT based at least in part on a parameter of the active environment.

2. The method of claim 1, wherein each of the plurality of attributes has a set of possible values and wherein the coverage model defines possible combinations of values of the attributes as covered by the plurality of tests.

3. The method of claim 1, wherein the coverage model is a functional coverage model of the SUT.

4. The method of claim 1, wherein the plurality of tests is generated using combinatorial test design (CTD).

5. The method of claim 1, further comprising determining a restriction between the first test and the second test to determine redundancy between the pair of tests.

6. The method of claim 1, wherein creating the minimal set of tests comprises:
   identifying, by the testing system, from the plurality of tests, a pair of tests that both test a first attribute of the coverage model;
   marking, by the testing system, a first test from the pair of tests as a redundant test; and
   creating the minimal set of tests by removing the first test that is marked redundant.

7. A system comprising:
   a memory device; and
   one or more processing units coupled with the memory device, the one or more processing units configured to perform a method comprising:
      generating a plurality of tests for testing a system under test (SUT) that is being executed in an active environment, the plurality of tests is generated based on a coverage model of the SUT, wherein the coverage model comprises a plurality of attributes;
      creating a minimal set of tests from the plurality of tests by selecting tests for a disjoint set of attributes from the plurality of attributes of the coverage model, wherein creating the minimal set of tests comprises:
         identifying, by the testing system, from the plurality of tests, a pair of tests that both test a first attribute of the coverage model; and
         marking, by the testing system, a first test from the pair of tests as a redundant test, and selecting, in the minimal set of tests, a second test that is not redundant; and
      executing the minimal set of tests on the SUT for analyzing a soft failure of the SUT in the active environment, wherein the soft failure occurs in the active environment during execution of the SUT based at least on a parameter of the active environment.

8. The system of claim 7, wherein each of the plurality of attributes has a set of possible values and wherein the coverage model defines possible combinations of values of the attributes as covered by the plurality of tests.

9. The system of claim 7, wherein the coverage model is a functional coverage model of the SUT.

10. The system of claim 7, wherein the plurality of tests is generated using combinatorial test design (CTD).

11. The system of claim 7, wherein the method further comprises determining a restriction between the first test and the second test to determine redundancy between the pair of tests.

12. The system of claim 7, wherein creating the minimal set of tests comprises:
    identifying, by the testing system, from the plurality of tests, a pair of tests that both test a first attribute of the coverage model; and
    marking, by the testing system, a first test from the pair of tests as a redundant test; and
    creating the minimal set of tests by removing the first test that is marked redundant.

13. A computer program product comprising a computer-readable storage medium having non-transitory computer-executable instructions stored thereupon, which when executed by a processor cause the processor to perform for testing a system under test (SUT) in an active environment, the method comprising:
    generating a plurality of tests for testing the SUT, the plurality of tests is generated based on a coverage model of the SUT, wherein the coverage model comprises a plurality of attributes;
    creating a minimal set of tests from the plurality of tests by selecting tests for a disjoint set of attributes from the plurality of attributes of the coverage model, wherein creating the minimal set of tests comprises:
       identifying, by the testing system, from the plurality of tests, a pair of tests that both test a first attribute of the coverage model; and
       marking, by the testing system, a first test from the pair of tests as a redundant test, and selecting, in the minimal set of tests, a second test that is not redundant; and executing the minimal set of tests on the SUT for analyzing a soft failure of the SUT in the active environment, wherein the soft failure occurs in the active environment during execution of the SUT based at least on a parameter of the active environment.

14. The computer program product of claim 13, wherein each of the plurality of attributes has a set of possible values and wherein the coverage model defines possible combinations of values of the attributes as covered by the plurality of tests.

15. The computer program product of claim 13, wherein the coverage model is a functional coverage model of the SUT.

16. The computer program product of claim 13, wherein the plurality of tests is generated using combinatorial test design (CTD).

17. The computer program product of claim 13, wherein the method further comprises determining a restriction between the first test and the second test to determine redundancy between the pair of tests.

* * * * *